Patented Sept. 1, 1931

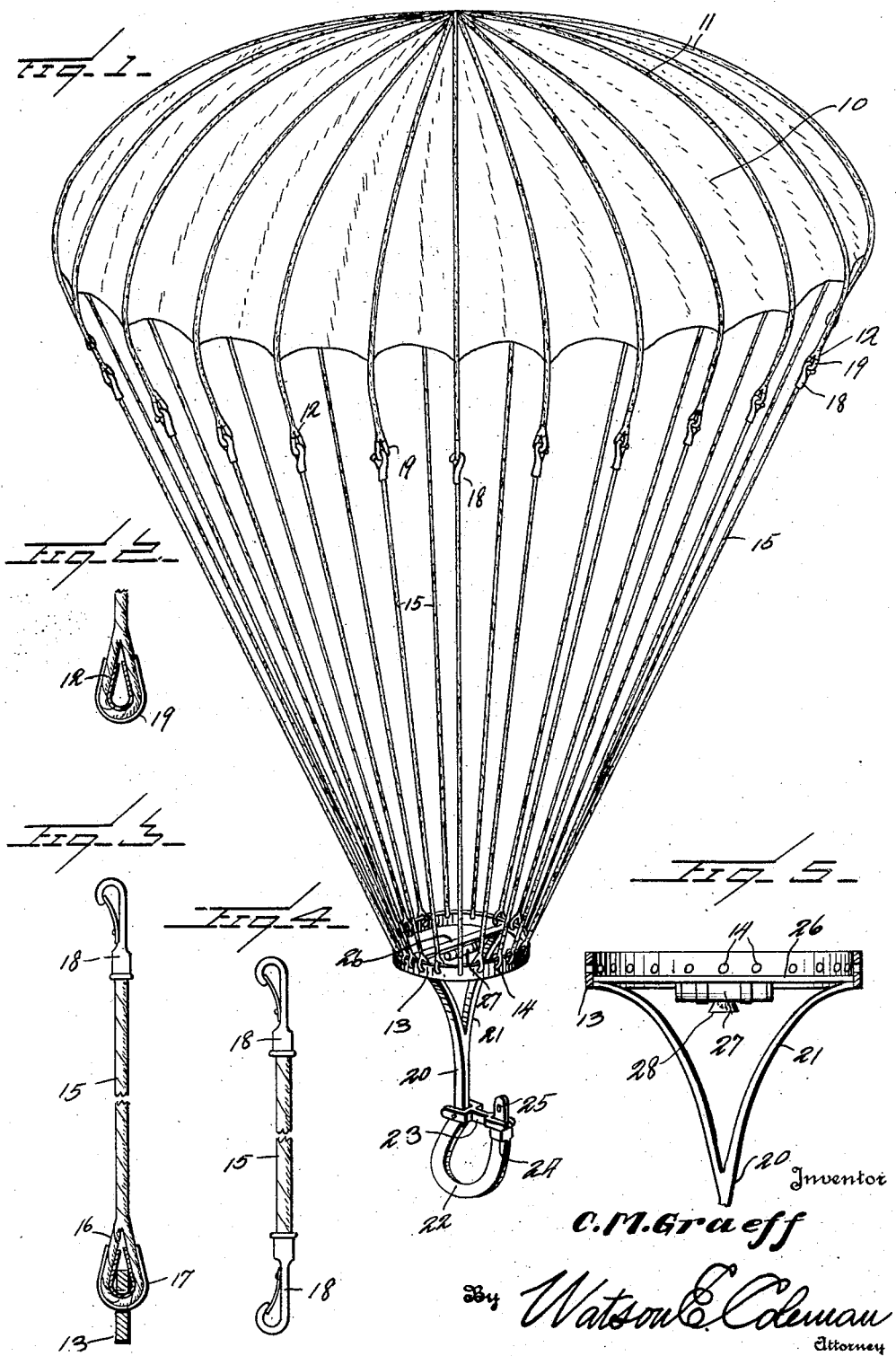

1,821,433

UNITED STATES PATENT OFFICE

CHARLES M. GRAEFF, OF HARRISBURG, PENNSYLVANIA

MAIL BAG PARACHUTE

Application filed March 11, 1930. Serial No. 434,909.

This invention relates to parachutes and particularly to parachutes for landing air mail from airplanes or zeppelins.

One of the objects of the present invention is to provide a parachute which will open readily and drop from the mail plane and in which the cords supporting the weight from the parachute are disposed within the seams or folds of the parachute and extend down beyond the edge of the parachute and are there detachably connected with continuation cords which extend down to the weight supporting ring.

A further object is to provide improved means for supporting the mail bag upon the weight supporting ring and provide means whereby an electric lamp with its battery may be carried by the bag supporting ring.

Other objects will appear in the course of the following description.

My invention is illustrated in the accompanying drawings, wherein:—

Figure 1 is a perspective view of a parachute constructed in accordance with my invention;

Figure 2 is a detailed sectional view of the lower end of one of the parachute ropes;

Figure 3 is an elevation of one of the extension cords which connect the parachute rope with the ring, the shield for preventing chafing of the rope being shown in section;

Figure 4 is an elevation of another form of extension rope or cord;

Figure 5 is a diametrical section through the ring showing the light used in descending.

Referring to these drawings, 10 designates the parachute proper. This may be formed in any suitable manner as for instance, the manner illustrated and described in my pending application for patent, Serial No. 413,623, filed December 12, 1929. As illustrated, the cords or ropes 11 extend from the center of the parachute radially and beyond the rim of the parachute and are formed with eyes 12 at the lower ends of these cords. Preferably these cords will be disposed within the folds of the parachute and preferably the cords will be stitched to the material of the parachute 10 throughout their whole extent. Carried below the parachute 10 is the mail bag supporting ring designated 13. This is formed with a plurality of holes 14 in the ring with which the lower ends of ring supporting cords or ropes 15 are engaged. As shown in Figure 3, the ring supporting rope 15 is formed with an eye 16 at its lower end, this eye being surrounded by a horse-shoe-shaped tubular shield 17 of metal. The eye extends through the perforation 14 in the ring 13 as does the shield. At its upper end, this rope 15 carries a snap hook 18 which is adapted to engage in the horse-shoe-shaped shield 19 which surrounds the eye 12 so that there will be no wear upon the eyes formed at the lower ends of the ropes 11 and no wear at the eye formed at the lower end of the rope 15.

In Figure 4, I show a modified form of the ring supporting rope 15 in which both ends of the rope are provided with the snap hooks 18 so that the lower end of the rope and the upper end of the rope may both be detachably connected, one to the ring 13 and the other to the eye 12.

The ring 13 has depending from it the substantially integral member 20, the upper end of which is formed with branching arms 21 engaged with the ring. The lower end of this member 20 is extended to form a shank which is bent to form a hook 22. Pivotally engaging on the shank of the hook is a latch 23 which is formed to embrace the extremity of the hook 22 and bear against a stop 24 on the hook adjacent its extremity. The extremity of the hook is formed with an aperture 25 through which the hasp of a padlock may be placed so as to lock the mail bag in place upon the hook and prevent its unauthorized detachment.

Preferably, there will extend diametrically across the ring, the cross bar 26 which supports therefrom a casing 27 containing a battery and a lamp. This may have the form of the ordinary flashlight, having a bulb and reflector 28, and be provided, of course, with a switch whereby the light may be turned off or on. At night if this parachute is to be dropped over the side of the airplane with a bag of mail, the light, will be turned on so that observers on the ground may note the descent of the parachute and the point of its descent.

I do not wish to be limited to the particular type of flashlight used or to the particular arrangement of the lamps therein.

It may be stated that in actual practice, the ring 13 is approximately twelve inches in diameter and the shank 20 may have any desired length, as for instance, a length of fifteen inches. The hook is solid cast steel and may be integral with the ring or attached thereto in any suitable manner.

By detachably connecting the ring 13 with the parachute either by the means shown in Figure 3 or that shown in Figure 4, it is possible to attach a large parachute to the ring 13 if a relatively heavy sack of mail is to be thrown over or attach a small parachute to the ring 13 in case a smaller sack of mail is to be thrown over. Thus a fifteen foot parachute will take care of one hundred and twenty-five pounds of mail, but where two hundred and fifty pounds of mail is to be thrown over, a larger parachute is needed. The operator will then release the snaps 18 from the small parachute and the parachute will descend under the weight of the mail.

I do not wish to be limited to the ropes being arranged to extend over the top of the parachute as the ropes may merely extend from the margin of the parachute. You will see that with this device, the downwardly directed lamp and bulb contained in the casing 27 will throw the light downward and thus the descent of the parachute observed and the mail bag readily found. This is particularly important at night where it is very difficult to make out the form of the descending parachute and the wind may cause the parachute to sail over the ground to a considerable distance from the place at which it is desired to drop it.

I claim:—

1. A mail bag carrying parachute having a plurality of ropes extending downwardly and centrally from the rim of the parachute, a frame supported by the lower end of said ropes and formed to support a mail bag, and means on the frame for supporting an illuminating lamp within the plane of the frame, the frame having a portion extending downward below the lamp to prevent contact of the lamp with the ground.

2. A mail bag carrying parachute having a series of ropes extending radially from the center of the parachute and downward over the rim thereof, a ring with which the lower ends of the ropes are engaged, a hook depending from the ring and having a latch, whereby a mail bag may be held in place upon the hook, the hook being provided with means whereby the latch may be locked, a cross bar extending across said ring, and an electric lamp mounted upon said cross bar.

3. A mail bag carrying parachute having a series of ropes extending radially from the center of the parachute and downward over the rim thereof and formed with eyes, a mail bag supporting ring, ropes extending upward from the ring and having snap hooks at their upper ends detachably engaged with said eyes, the ring having a depending hook, the hook having a latch to hold the mail bag in place, and having means whereby the latch may be locked, and means on the ring for supporting an electric lamp and battery above the depending hook.

In testimony whereof I hereunto affix my signature.

CHARLES M. GRAEFF.